United States Patent
Li et al.

(10) Patent No.: US 8,797,011 B2
(45) Date of Patent: Aug. 5, 2014

(54) VARIABLE CURRENT LIMITER FOR REGULATOR

(75) Inventors: Hongping Li, Richardson, TX (US); Vijayan Joseph Thottuvelil, Addison, TX (US)

(73) Assignee: General Electric Company, Schenectady, NY (US)

( * ) Notice: Subject to any disclaimer, the term of this patent is extended or adjusted under 35 U.S.C. 154(b) by 516 days.

(21) Appl. No.: 12/966,613

(22) Filed: Dec. 13, 2010

(65) Prior Publication Data

US 2011/0169469 A1    Jul. 14, 2011

Related U.S. Application Data

(60) Provisional application No. 61/293,274, filed on Jan. 8, 2010.

(51) Int. Cl.
*H02M 3/156* (2006.01)
*G05F 1/573* (2006.01)

(52) U.S. Cl.
USPC ............................. 323/284; 323/276; 323/908

(58) Field of Classification Search
USPC ........... 361/93.9, 18; 323/282–285, 351, 901, 323/908, 273–276
See application file for complete search history.

(56) References Cited

U.S. PATENT DOCUMENTS

| | | | | |
|---|---|---|---|---|
| 4,631,470 A | * | 12/1986 | Bingley | 323/282 |
| 4,914,357 A | * | 4/1990 | Valley | 315/309 |
| 7,215,105 B2 | * | 5/2007 | Balakrishnan et al. | 323/282 |
| 7,279,873 B2 | * | 10/2007 | Lin et al. | 323/277 |
| 2006/0164773 A1 | * | 7/2006 | Stanford et al. | 361/93.1 |

FOREIGN PATENT DOCUMENTS

CN    1456029 A    11/2003
CN    101116285 A    1/2008

OTHER PUBLICATIONS

Texas Instruments; Wide-Input Synchronous Buck Controller; www.ti.com; Dec. 2003—Revised Sep. 2008; 35 pages.
China Office Action for related matter 201110002467.6 dated Apr. 29, 2014, 7 pages.

* cited by examiner

*Primary Examiner* — Jessica Han
(74) *Attorney, Agent, or Firm* — General Electric Company (57) ABSTRACT

A variable current limiter, a power supply and a method of operating a non-isolated voltage converter are disclosed herein. In one embodiment, the variable current limiter includes: (1) a converter controller configured to regulate an output voltage of a non-isolated voltage converter and limit an output current thereof and (2) a limit provider configured to provide a variable output current limit that inversely varies with the output voltage, the converter controller configured to employ the variable output current limit to limit the output current.

19 Claims, 4 Drawing Sheets

VARIABLE CURRENT LIMITER FOR REGULATOR

CROSS-REFERENCE TO RELATED APPLICATION

This application claims the benefit of U.S. Provisional Application Ser. No. 61/293,274, filed by Hongping Li, et al. on Jan. 8, 2010, entitled "OUTPUT VOLTAGE DEPENDENT VARIABLE CURRENT LIMIT FOR POINT OF LOAD DC-DC CONVERTERS," commonly assigned with this application and incorporated herein by reference.

TECHNICAL FIELD

This application is directed, in general, to power conversion and, more specifically, to preventing damage to non-isolated voltage converters.

BACKGROUND

Voltage converters are widely used to convert an input voltage to a needed voltage for a specific component or load. Non-isolated converters are one type of voltage converter that provide this conversion function without isolation between the input and output. One strategy used to protect non-isolated voltage converters from output overcurrent is to implement a shutdown mechanism that can be triggered by a fixed output current limit. Non-isolated voltage converters can then be shutdown when exceeding the fixed current limit and restarted following an over-current induced shutdown.

SUMMARY

One aspect provides a variable current limiter. In one embodiment the variable current limiter includes: (1) a converter controller configured to regulate an output voltage of a non-isolated voltage converter and limit an output current thereof and (2) a limit provider configured to provide a variable output current limit that inversely varies with the output voltage, the converter controller configured to employ the variable current limit to limit the output current.

In another aspect a method of operating a non-isolated voltage converter is disclosed. In one embodiment the method includes: (1) determining a variable output current limit for an output current of the non-isolated voltage converter that is a function of an output voltage of the non-isolated voltage converter and (2) controlling the non-isolated voltage converter to limit the output current based on the variable output current limit.

In yet another aspect, a power supply is provided. In one embodiment the power supply includes: (1) a non-isolated voltage converter configured to receive an input voltage and provide an output voltage and an output current and (2) a variable current limiter configured to determine a variable output current limit for the output current that is a function of the output voltage and control the non-isolated voltage converter to limit the output current based on the variable output current limit.

In still yet another aspect, a point of load (POL) converter is disclosed. In one embodiment, the POL converter includes: (1) a pulse width modulator controller configured to regulate an output voltage of the POL converter and limit an output current thereof and (2) a limit provider coupled to the converter controller and configured to provide a variable output current limit that inversely varies with the output voltage. The limit provider including: (2A) a fixed current limiter and (2B) a limit adjuster coupled to the fixed current limiter and configured to provide an adjustment current that is proportional to the output voltage, wherein the limit provider employs the adjustment current and a base current limit associated with the fixed current limiter to provide the variable output current limit. The pulse width modulator controller configured to employ the variable current limit to limit the output current.

BRIEF DESCRIPTION

Reference is now made to the following descriptions taken in conjunction with the accompanying drawings, in which.

DETAILED DESCRIPTION

Employing a fixed limit for an output current of a non-isolated voltage converter can constrain the amount of power that can be delivered at higher output voltages for non-isolated voltage converters having an extended output voltage range. For instance, POL voltage converters are an example of non-isolated DC-DC converters that convert a DC voltage to a regulated output DC voltage delivered to a load. With POL converters, a variety of DC-DC conversion topologies, such as buck, buck-boost and boost topologies, can be used for applications where no electrical isolation is required between input and output. In some of these applications for POL converters, it can be beneficial to both operate off a wide input voltage range (e.g., 9V to 36VDC) as well as provide a widely adjustable output voltage range (e.g., 3V to 18VDC). In a wide output range POL converter, implementing a fixed output current limit can impose the limitation that the current limit level constrains the total output power that can be delivered at the highest voltage.

For example, if the output voltage in a POL converter is set to be adjustable from 3V to 18V and the output current limit is set at 5 A, then the output power capability ranges from 15 W (3V×5 A) to 90 W (18V×5 A). Since the package size of a POL voltage converter can be proportional to the total output power, the package in this example would have to be sized for 90 W. If the output current at the high end of the output voltage range of the POL converter was limited to 3 A at 18V, then the output power capability at the lower end of the output voltage range would only be 9 W (3V×3 A).

In contrast to constraining the output power at a high voltage level, this disclosure provides a variable current limiting scheme for output current that is employable with non-isolated voltage converters. Thus, instead of employing a fixed current limit, the disclosure provides a current limiting design for non-isolated voltage converters that varies based on an output voltage. In the disclosed embodiments, the current limit varies inversely with the output voltage. The variable current limiting design may be used with a non-isolated voltage converter to maintain a more constant power output compared to a non-isolated voltage converter employing a fixed current limit design. Using the above example, if a variable current limit were implemented that ranged from 5 A at 3Vout to 3 A at 18Vout, the amount of output power that can be delivered from the POL converter design in a certain package size can be optimized over what is possible using a fixed current limit.

Figure 1:
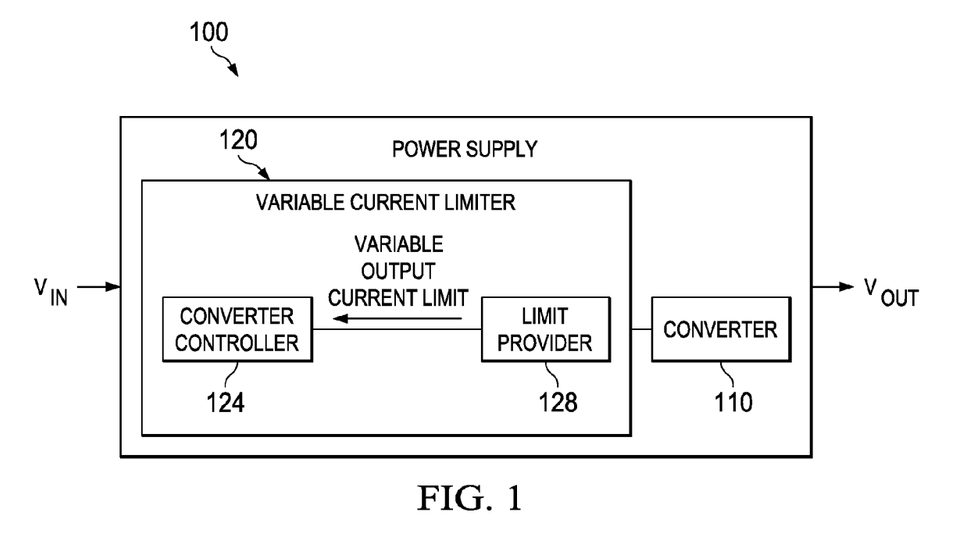
FIG. 1 illustrates a block diagram of an embodiment of a power supply constructed according to the principles of the disclosure.

FIG. 1 illustrates a block diagram of an embodiment of a power supply 100 constructed according to the principles of the disclosure. The power supply 100 includes a non-isolated voltage converter 110 and a variable current limiter 120. One skilled in the art will understand the general operation and configuration of a non-isolated power supply and understand that the power supply 100 may include additional components or interfaces that are typically included in a power supply.

The power supply 100 provides an output voltage $V_{OUT}$ from an input voltage $V_{IN}$. The power supply 100 may be employed in various applications. In some embodiments, the power supply 100 may receive a DC input voltage and provide another DC output voltage. In one embodiment, the non-isolated power supply 100 may be a POL power supply.

The non-isolated voltage converter 110 (hereinafter referred to as the voltage converter 110) is configured to receive an input voltage $V_{IN}$ and provide an output voltage $V_{OUT}$. The voltage converter 110 may be a DC to DC converter that receives a DC input voltage and converts that DC input voltage to a different DC output voltage. The topology of the voltage converter 110 may vary depending on the application. In some embodiments, the voltage converter 110 may be a buck converter. In other embodiments, the voltage converter 110 may be a boost converter. Alternatively, the voltage converter 110 may employ a buck-boost topology. In one embodiment, the voltage converter 110 may be a POL converter. For example, the voltage converter 110 may be a POL converter that employs a buck topology.

The variable current limiter 120 is configured to determine an output current limit for the output current of the converter 110. The output current limit is a variable value that is a function of the output voltage of the converter 110. The output current limit inversely varies with the output voltage of the voltage converter 110. The variable current limiter 120 is further configured to control the voltage converter 110 to limit the output current based on the output current limit. The various functions of the variable current limiter 120 may be performed by a converter controller 124 and a limit provider 128.

The converter controller 124 is configured to regulate the output voltage of the voltage converter 110 and limit the output current based on the output current limit. The converter controller 124 is configured to generate drive signals to operate the switches of the voltage converter 110 in order to regulate the operation thereof. In one embodiment, the converter controller 124 may be a pulse width modulator (PWM) controller.

As noted above, the converter controller 124 may be configured to control the operation of the switches of the voltage converter 110 and regulate the output voltage $V_{OUT}$. In one embodiment, the converter controller 124 can compare a sensed voltage associated with the voltage converter 110 to a reference voltage and control switching of the voltage converter 110 such that the sensed voltage tracks the reference voltage. The converter controller 124 may implement a shutdown mechanism that is triggered when the output current exceeds the output current limit and shuts off the voltage controller 110 or the power supply 100. The converter controller 124 may then attempt to restart the voltage converter 110 following an overcurrent-induced shutdown (auto-restart feature) and can periodically attempt these restarts until an output fault is cleared or the power supply 100 is externally turned off. The converter controller 124 and the voltage converter 110 may be conventional devices that are typically employed in power supplies.

The limit provider 128 may include a fixed current limiter and a limit adjuster coupled thereto. The fixed current limiter may be coupled to an input of the converter controller 124. The fixed current limiter is used to set a base limit for the output current of the voltage converter 110. The fixed current limiter can allow a current limit to be set external to the converter controller 124. The fixed current limiter can be used to set the base limit for different designs of the voltage converter 110. In one embodiment, the fixed current limiter is a resistor. As such, the resistance of the resistor can be selected to provide a desired value for a base current limit for particular non-isolated voltage converter designs.

The limit adjuster may be configured to provide an adjustment current $I_{adj}$ that is proportional to the output voltage $V_{OUT}$ of the voltage converter 110. The adjustment current $I_{adj}$ can be used with the base current limit to provide the variable output current limit for the voltage converter 110. The converter controller 124 can use the variable output current limit to control operation of the voltage converter 110.

In some embodiments, the limit adjuster is configured to provide the adjustment current $I_{adj}$ based on a specified value of the output voltage $V_{OUT}$. For example, the limit adjuster may include a threshold component that limits the adjustment current $I_{adj}$ to zero until the output voltage $V_{OUT}$ reaches a threshold determined by the threshold component. In one embodiment, the threshold component may be a zener diode.

In one embodiment, the limit adjuster may include a first resistor, a second resistor, a capacitor and a diode coupled together. The first resistor and the diode are coupled in series at a node and the second resistor and the capacitor are coupled in together in parallel from the node. In one embodiment, the fixed current limiter may be coupled to the limiter adjuster via the first resistor and to the voltage converter 110 via the diode. In other embodiments, the limit adjuster includes a threshold component that is coupled in series between the first resistor and the static current limiter.

Figure 2:
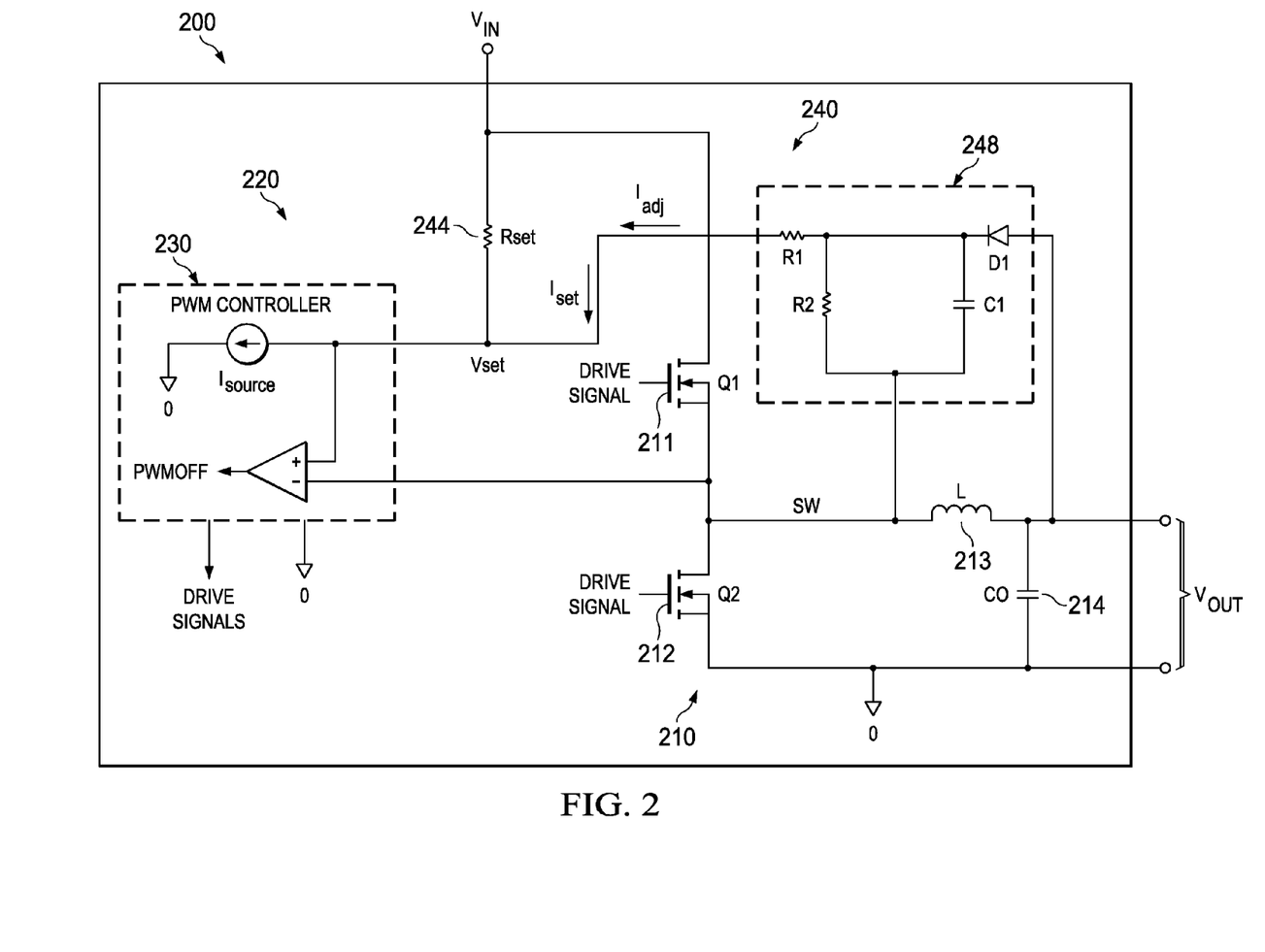
FIG. 2 illustrates a schematic diagram of an embodiment of a POL converter constructed according to the principles of the disclosure.

FIG. 2 illustrates a schematic diagram of an embodiment of a POL converter 200 constructed according to the principles of the disclosure. The POL converter 200 is a non-isolated converter that includes a non-isolated voltage converter 210 (hereinafter referred to as the voltage converter 210) and a variable current limiter 220. The POL converter 200 may be employed in various applications. In FIG. 2, the POL converter 200 is a buck DC to DC converter. In some applications, the POL converter 200 may be part of a power supply such as the power supply 100 of FIG. 1.

The voltage converter 210 includes a first switch 211, a second switch 212, an inductor 213 and a capacitor 214. In FIG. 2, both the first switch 211 and the second switch 212 are N-channel MOSFETs.

The variable current limiter 220 includes a converter controller 230 and a limit provider 240. The converter controller 230 may be a PWM controller as illustrated in FIG. 2. In one embodiment, the converter controller 230 may be a conventional POL synchronous buck controller such as a TPS40057 PWM controller distributed by Texas Instruments of Dallas, Tex. The limit provider 240 includes a fixed current limiter 244 and a limit adjuster 248. The fixed current limiter 244 may be a resistor that is coupled to converter controller 230 and the limit provider 248. In FIG. 2, the fixed current limiter 244 is the resistor Rset that is external to the converter controller 230 and coupled between $V_{IN}$ and a Vset pin of the converter controller 230. The fixed current limiter 244 can be used to provide a base current limit for the output current of the voltage converter 210.

The converter controller 230 provides a drive signal for the first and second switches 211, 212. The converter controller 230 is configured to sense the voltage across the first switch 211 during the time period when the first switch 211 is ON and compare this sensed voltage to the voltage at the Vset pin. The voltage at pin Vset is derived as the drop across the fixed current limiter 244 and $I_{source}$, an internal current source of the converter controller 230 (i.e., the voltage drop is ($I_{source} \times$ Rset). During a converter switching cycle, when the voltage drop across the first switch 211 exceeds the voltage at pin Vset, this indicates an overcurrent situation and the drive to switch 211 is terminated for that switching cycle. In addition, the PWM controller may initiate a shutdown and converter restart cycle if the overcurrent condition persists for one or more switching cycles based on the voltage across switch 211 exceeding the voltage at pin Vset for one or more consecutive switching cycles. This technique provides a method for a current limit for the output current of the voltage converter 210 to be set external to the converter controller 230 by adjusting the value of the fixed current limiter 244 (i.e., the resistor Rset). The value of the fixed current limiter 244 may be varied from design to design of non-isolated voltage converters to obtain a desired base current limit for the ouput current of a particular non-isolated voltage converter.

The limit adjuster 248 is additional circuitry, including R1, R2, C1 and D1, that is coupled to the fixed current limiter 244. The limit adjuster 248 provides an additional current $I_{adj}$ into the Vset pin that is proportional to output voltage $V_{OUT}$. Since the current drawn by the internal current source $I_{source}$ within the converter controller 230 is fixed, an increase in $I_{adj}$ causes the current $I_{set}$ to decrease. As the output voltage $V_{OUT}$ increases, the total current $I_{set}$ through the fixed current limiter 244 decreases causing a drop across the fixed current limiter 244 that decreases as the output voltage $V_{OUT}$ increases.

More specifically, when switch 212 is ON and switch 211 is OFF, the node SW is at a potential that is substantially close to ground. This causes a current to flow from output voltage $V_{OUT}$ through D1 and R2 in parallel with C1 back to the node SW. During the time period when switch 212 is ON, capacitor C1 is charged up to the output voltage $V_{OUT}$. The time constant of C1 and R2 is such that C1 can hold its charge close to the output voltage $V_{OUT}$ for a few switching cycles due to diode D1 being reversed biased when switch 211 is turned ON and switch 212 is OFF. On a steady state basis, the voltage at C1 is equal to the output voltage $V_{OUT}$. On the steady state basis, the voltage at C1 also slowly follows changes in the output voltage $V_{OUT}$ which is determined by the time constant of C1 and R2. In some embodiments, the limit adjuster 248 may not include R2. In these embodiments, the voltage across C1 will slowly track the output voltage $V_{OUT}$.

When switch 212 is turned OFF and switch 211 is turned ON, the lower end of capacitor C1 (which is the node SW) is now substantially close to the voltage $V_{IN}$ being only separated essentially by the ON-state drop across the switch 211. As such, the voltage at the upper end of C1 is higher than $V_{IN}$ and a current flows through R1 that is proportional to the output voltage $V_{OUT}$. The voltage at the upper end of C1 may be higher than $V_{IN}$ by the charged up voltage across C1 which is approximately equal to the output voltage $V_{OUT}$. Since at node Vset, $$I_{set} = I_{source} - I_{adj},$$

the overall effect is to reduce $I_{set}$ as $I_{adj}$ (which is equal to the voltage across C1 divided by R1) increases proportional to the output voltage $V_{OUT}$. Therefore, the output current limit varies and the value thereof can be adjusted down as the output voltage $V_{OUT}$ increases.

Figure 3:
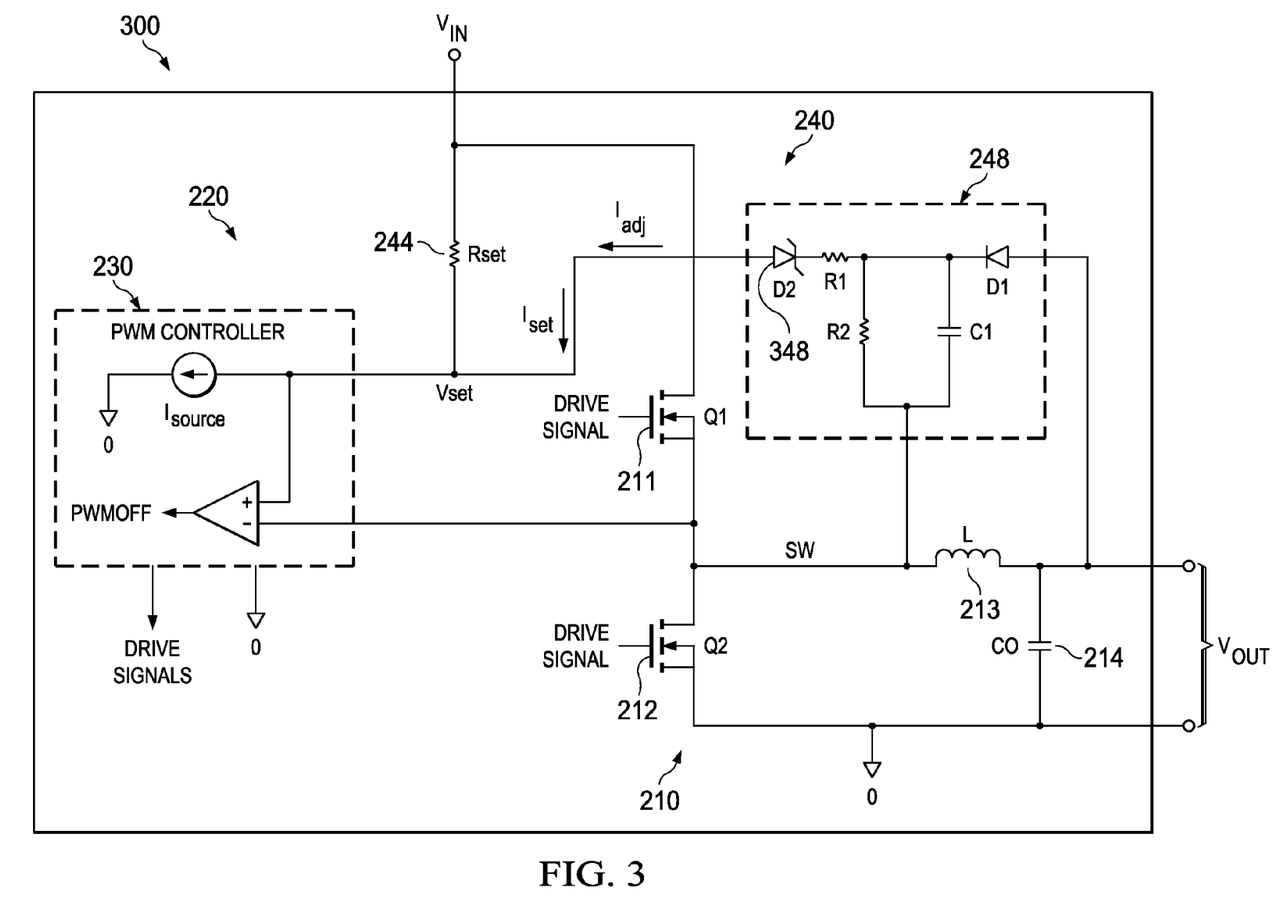
FIG. 3 illustrates a schematic diagram of another embodiment of a POL converter constructed according to the principles of the disclosure.

FIG. 3 illustrates a schematic diagram of another embodiment of a voltage converter, non-isolated POL converter 300, constructed according to the principles of the disclosure. In this embodiment, the current limit adjustment is limited to output voltages above a certain specified value. As such, a threshold component 348 is added to the limit adjuster 248. As illustrated in FIG. 3, the threshold component 348 may be a zener diode that is added in series with R1.

Figure 4:
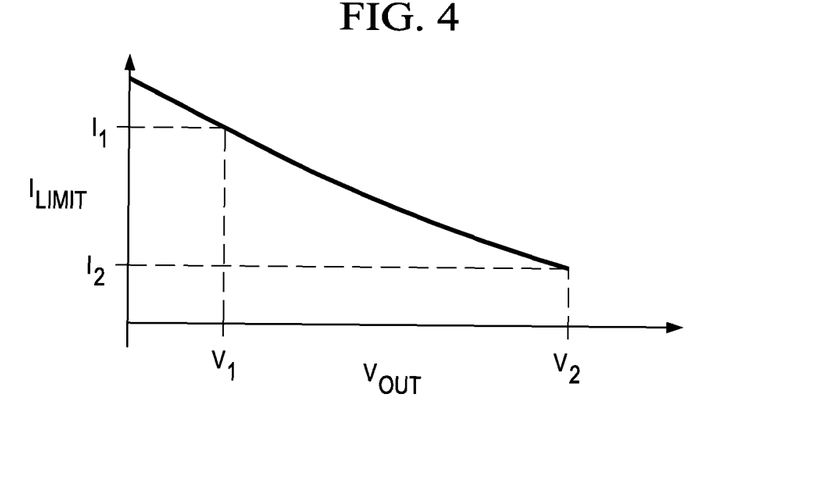
FIG. 4 illustrates a graph of a variable current limit associated with the POL voltage converter of FIG. 2.
Figure 5:
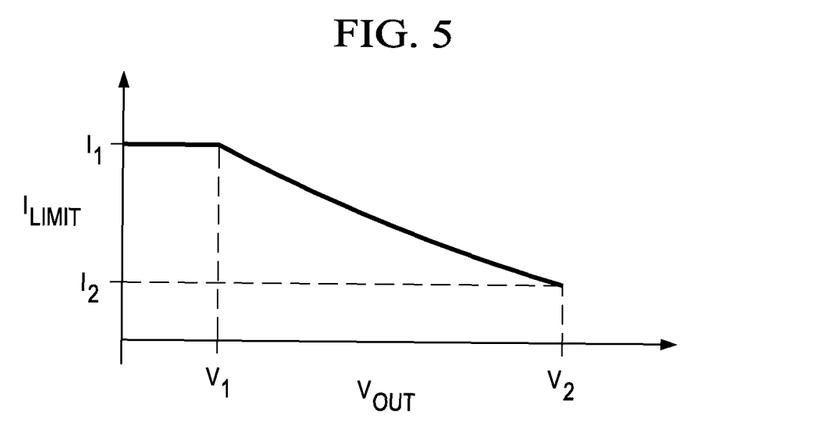
FIG. 5 illustrates a graph of a variable current limit associated with the POL voltage converter of FIG. 3.

The different graphs of the variable output current limit from the POL converters 200 and 300 are illustrated in FIG. 4 and FIG. 5. FIG. 4 illustrates a graph of a variable current limit associated with the POL converter of FIG. 2. FIG. 5 illustrates a graph of a variable current limit associated with the POL converter of FIG. 3. In both graphs, the value of the current limit inversely varies with the output voltage $V_{OUT}$ of the POL converters 200 and 300. In FIG. 5, the graph illustrates variation of the current limit with the output voltage $V_{OUT}$ when the output voltage $V_{OUT}$ is above the threshold value $V_1$. The threshold component 348 of FIG. 3 determines the I1, V1 point of FIG. 5.

Figure 6:
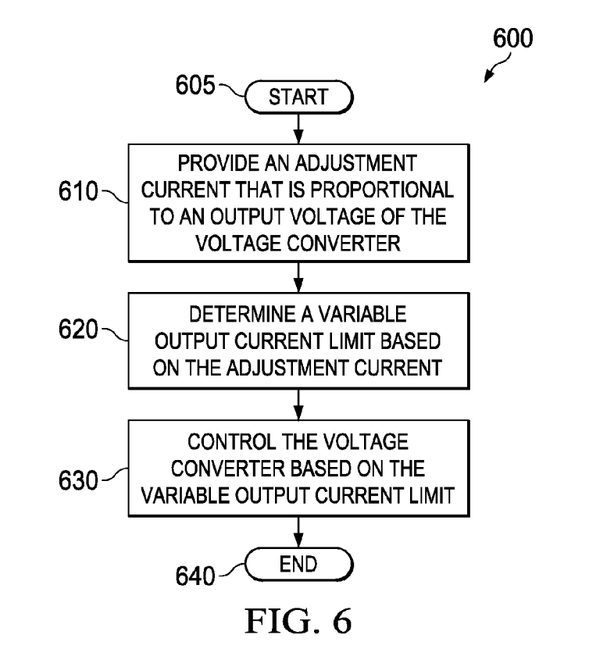
FIG. 6 illustrates a flow diagram of a method of operating a non-isolated voltage converter carried out according to the principles of the disclosure.

FIG. 6 illustrates a flow diagram of a method of operating a non-isolated voltage converter carried out according to the principles of the disclosure. The method begins in a step 605.

In a step 610, an adjustment current is provided that is proportional to an output voltage of the non-isolated voltage converter. In some embodiments, the adjustment current may be provided based on a specified value of the output voltage.

In a step 620, an output current limit is determined based on the adjustment current. As such, the output current limit for the output current is a variable limit that is a function of the output voltage. Additionally, the output current limit value inversely varies with the output voltage. Determining the variable output current limit value is further based on a current source of a converter controller for the non-isolated voltage converter. In some embodiments, the variable output current limit is determined based on the difference between the current source of the converter controller and the adjustment current.

The non-isolated voltage converter is then controlled based on the output current limit to limit the output current based on the variable output current limit in a step 630. The method 600 then ends in a step 640.

The disclosure provides employing a variable output current limit to limit the output current of non-isolated voltage converters. As demonstrated, the non-isolated voltage converters may be POL converters. Limiting output current in a POL converter may be implemented in a PWM controller used to control the switching MOSFETs and regulate the output voltage. Various schemes may be employed that generally obtain a signal sensed to be proportional to output current and compare it to an reference voltage that is either internally set in the PWM controller or set using a fixed current source fed into a resistor external to the PWM controller. A first scheme senses the voltage across the upper MOSFET in a POL topology such as a buck converter, compares the sensed voltage to a fixed reference voltage or one using the combination of a current source in the PWM controller and an external resistor, and shuts down the PWM switching when the sensed voltage exceeds the reference voltage. Another scheme senses the voltage across the lower MOSFET in a POL topology such as a buck converter, compares the sensed voltage to a reference voltage, and shuts down the PWM switching when the sensed voltage exceeds the reference voltage. Yet another scheme may use an R-C network across the output filter inductor in a POL topology such as a buck converter to derive a voltage drop proportional to inductor current, compare the sensed voltage to a reference voltage, and shut down the PWM switching when the sensed voltage exceeds the reference voltage.

The concept of variable current limiting based on output voltage can be used in each of these three current limit schemes and also with a range of topologies used in POLs. FIG. 2 and FIG. 3 provide examples of non-isolated voltage converters to illustrate this concept for the current limiting scheme used with a integrated circuit PWM controller that senses the voltage across the upper MOSFET of a buck converter. The disclosed concept of variable current limiting may also be used with the other current limiting schemes and with other types of non-isolated voltage converters. In addition, the concept may be used with either analog or digital PWM controllers for POL DC-DC converters or controllers employing a hybrid of analog and digital control techniques.

Those skilled in the art to which this application relates will appreciate that other and further additions, deletions, substitutions and modifications may be made to the described embodiments.

What is claimed is:

1. A variable current limiter, comprising:
   a converter controller configured to regulate an output voltage of a non-isolated voltage converter and limit an output current thereof; and
   a limit provider configured to provide a variable output current limit that inversely varies with said output voltage, wherein said variable output current limit is based on an adjustment current that is proportional to said output voltage, and wherein said converter controller is configured to employ said variable current limit to limit said output current.

2. The variable current limiter as recited in claim 1 wherein said limit provider includes a fixed current limiter and a limit adjuster, wherein said limit adjuster provides said adjustment current.

3. The variable current limiter as recited in claim 2 wherein said limit adjuster is configured to provide said adjustment current based on a specified value of said output voltage.

4. The variable current limiter as recited in claim 2 wherein said converter controller includes a first input that is coupled to said fixed current limiter and said limit adjuster.

5. The variable current limiter as recited in claim 2 wherein said limit adjuster includes a first resistor, a second resistor, a capacitor and a diode, wherein said first resistor and said diode are coupled in series at a node and said second resistor and said capacitor are coupled in parallel from said node.

6. The variable current limiter as recited in claim 5 wherein said limit adjuster further includes a threshold component coupled in series with said first resistor.

7. A method of operating a non-isolated voltage converter, comprising:
   determining a variable output current limit for an output current of said non-isolated voltage converter that is a function of an output voltage of said non-isolated voltage converter, wherein said variable output current limit is determined based on an adjustment current that is proportional to said output voltage of said non-isolated voltage converter; and
   controlling said non-isolated voltage converter to limit said output current based on said variable output current limit.

8. The method as recited in claim 7 wherein said variable output current limit inversely varies with said output voltage.

9. The method as recited in claim 7 wherein said adjustment current is based on a specified of said output voltage.

10. The method as recited in claim 7 wherein determining a variable output current limit is further based on a current source of a converter controller for said non-isolated voltage converter.

11. The method as recited in claim 10 wherein determining said variable output current limit is based on a difference between said current source and said adjustment current.

12. A power supply, comprising:
   a non-isolated voltage converter configured to receive an input voltage and provide an output voltage and an output current; and
   a variable current limiter that includes a limit provider configured to provide an adjustment current that is proportional to said output voltage, said variable current limiter configured to:
      determine a variable output current limit for said output current that is a function of said output voltage; and
      control said non-isolated voltage converter to limit said output current based on said variable output current limit.

13. The power supply as recited in claim 12 wherein said variable output current limit inversely varies with said output voltage.

14. The power supply as recited in claim 12 wherein said limit provider is configured to provide said adjustment current based on a specified value of said output voltage.

15. The power supply as recited in claim 12 wherein said variable current limiter further includes a converter controller configured to regulate said output voltage of said non-isolated voltage converter and limit said output current based on said variable output current limit.

16. The power supply as recited in claim 15 wherein said limit provider includes a fixed current limiter and a limit adjuster coupled thereto.

17. The power supply as recited in claim 12 wherein said limit adjuster includes a first resistor, a second resistor, a capacitor and a diode, wherein said first resistor and said diode are coupled in series at a node and said second resistor and said capacitor are coupled in parallel from said node.

18. The power supply as recited in claim 17 wherein said limit adjuster further includes a threshold component coupled in series with said first resistor.

19. A point of load converter, comprising:
   a pulse width modulator controller configured to regulate an output voltage of said point of load converter and limit an output current thereof; and
   a limit provider coupled to said converter controller and configured to provide a variable output current limit that inversely varies with said output voltage, said limit provider including:
      a fixed current limiter, and
      a limit adjuster coupled to said static current limiter and configured to provide an adjustment current that is proportional to said output voltage, wherein said limit provider employs said adjustment current and a base current limit associated with said static current limiter to provide said variable output current limit, said pulse width modulator controller configured to employ said variable current limit to limit said output current.

* * * * *

UNITED STATES PATENT AND TRADEMARK OFFICE
CERTIFICATE OF CORRECTION

| | | |
|---|---|---|
| PATENT NO. | : 8,797,011 B2 | Page 1 of 1 |
| APPLICATION NO. | : 12/966613 | |
| DATED | : August 5, 2014 | |
| INVENTOR(S) | : Li et al. | |

It is certified that error appears in the above-identified patent and that said Letters Patent is hereby corrected as shown below:

In the Specification

In Column 5, Line 29, delete "ouput" and insert -- output --, therefor.

In the Claims

In Column 8, Line 7, in Claim 9, delete "specified of" and insert -- specified value of --, therefor.

Signed and Sealed this
Fourth Day of August, 2015

Michelle K. Lee
*Director of the United States Patent and Trademark Office*